Patented Oct. 12, 1926.

1,602,959

UNITED STATES PATENT OFFICE.

ARTHUR ARENT, OF DES MOINES, IOWA, ASSIGNOR TO ARTHUR ARENT LABORATORIES, INC., OF DES MOINES, IOWA, A CORPORATION OF IOWA.

PRESERVATIVE TREATMENT OF WOOD AND OTHER MATERIALS.

No Drawing. Application filed December 14, 1925. Serial No. 75,404.

This invention relates to preservative treatment of wood and other materials; and it has to do more particularly with a perservative process wherein a composition comprising an antimony group metal compound dissolved in a solution of an alkali metal chlorid or an alkaline earth metal chlorid is applied to the material to be treated.

The material treated in accordance with the invention may be benefited in various ways. If combustible, it is rendered more fire resistant. If normally subject to attack by rot or decay organisms or by insects or other forms of animal life such as moths, borers and the like, it is protected therefrom. Other preservative effects attainable by means of the process of this invention will appear hereinafter.

As the preservative treatment of wood constitutes at present one of the most important practical applications of the invention, this will be more particularly referred to hereinafter by way of a concrete example serving to illustrate and explain the underlying principles upon which the broad invention is based.

According to the process of the present invention, wood can be rendered substantially immune for long periods of time to destruction by decay or to the attack of the Teredo or marine borer, and at the same time can be fireproofed or rendered highly fire-resistant by treatment with a brine solution of an antimony group metal compound that is soluble in such brine. Taking antimony trichloride as a typical and particularly advantageous example of an antimony group metal compound for this purpose, relatively large quantities of this may be dissolved in a strong or saturated solution of common salt (sodium chlorid) to provide a treating solution eminently well adapted for the treatment of wood to preserve and fireproof the same. In preparing such a treating solution, a saturated solution of the antimony compound in the brine may be prepared at ordinary temperatures and the clear solution applied to the wood either in this concentrated form or diluted with further additions of the brine. A limited quantity of plain water may also be used in diluting, but care must be taken not to add so much water as to cause formation and precipitation of basic antimony salts.

The application of the treating solution to the wood may be effected in any suitable way within the scope of the invention. In treating timbers, fence posts, telephone or telegraph posts, or the like, a simple dipping treatment, or even merely brushing the solution on the outer surface, will give sufficient surface impregnation to afford substantial protective effect. Where it is deemed necessary or desirable, however, to obtain deeper or more complete impregnation, other timber-impregnating processes may be used, such as alternating vacuum and pressure treatment, as may be desired. Such methods are in general well known in the wood-treating art and the specific details thereof form no part of the present invention.

The solution penetrates well into the fiber of wood and the antimony salt deposited therein is a powerful toxic agent effectively protecting the wood against decay and rot organisms and also, in the case of marine piling, for example, from attacks by the Teredo or marine borer. The fireproofing effect is also pronounced, wood treated in accordance with the process merely charring without inflaming when subjected to direct flame for long periods of time. Similarly other combustible fibrous materials may be rendered fire-resistant.

Where antimony trichlorid is used, it is desirable to employ pure anhydrous antimony trichlorid crystals in making up the solution. However, this is not essential in the broader aspects of the invention since ordinary butter of antimony or other commercial forms of antimonous chlorid are operative. In place of sodium chlorid it is possible to use other alkali metal or alkaline earth metal chlorids such as potassium chlorid, calcium chlorid or the like. Some of these, such as potassium chlorid, are of course much more expensive than common salt and therefore the cheaper chlorids are more commonly used in practicing the invention. For convenience, solutions of alkali metal and alkaline earth metal chlorids may be generically termed brines.

In the preservative treatment of materials generally for destruction of insects and bugs and for disinfection, the new process is effective. In the upkeep of railway roadbeds and right of ways, highways, etc., the process is of value for exterminating weeds, it being found only necessary to spray a brine solution of antimony trichlorid, for example, on the ground which it is desired to keep clear. These are typical of preservative treatments within the scope of the invention in its broader aspects.

What I claim is:

1. The process of protectively treating material which comprises applying to the material a brine solution of an antimony group metal compound.

2. The process of protectively treating material which comprises applying to the material a brine solution of antimony trichlorid.

3. The process of protectively treating combustible fibrous material which comprises applying thereto a brine solution of an antimony group metal compound in quantity sufficient to render said material substantially more fire-resistant.

4. The process of protectively treating wood which comprises impregnating wood at least superficially with a brine solution of an antimony group metal compound.

5. The process of protectively treating wood which comprises impregnating wood at least superficially with a sodium chlorid solution of antimony trichlorid.

6. The process of protectively treating wood which comprises impregnating wood at least superficially with a concentrated sodium chlorid solution of antimony trichlorid.

In testimony whereof I hereunto affix my signature.

ARTHUR ARENT.